(12) United States Patent
Pallmann

(10) Patent No.: US 6,551,090 B2
(45) Date of Patent: Apr. 22, 2003

(54) APPARATUS FOR THE AGGLOMERATION OF FEED MATERIAL WITH THERMOPLASTIC PROPERTIES

(75) Inventor: Wilhelm Pallmann, Zweibrücken (DE)

(73) Assignee: Pallman Maschinenfabrik GmbH & Co. KG, Zweibrücken (DE)

( * ) Notice: Subject to any disclaimer, the term of this patent is extended or adjusted under 35 U.S.C. 154(b) by 0 days.

(21) Appl. No.: 09/861,154

(22) Filed: May 18, 2001

(65) Prior Publication Data
US 2001/0043961 A1 Nov. 22, 2001

(30) Foreign Application Priority Data
May 19, 2000 (DE) .......................... 100 24 157

(51) Int. Cl.[7] ................................................ B29B 9/08
(52) U.S. Cl. .................. 425/382 R; 425/311; 425/331; 425/DIG. 230
(58) Field of Search ................. 425/223, 310, 425/311, 331, 382 R, DIG. 230; 264/142; 100/903, 905, 907

(56) References Cited

U.S. PATENT DOCUMENTS 5,009,586 A * 4/1991 Pallmann .................... 264/142
5,486,102 A * 1/1996 Ettie et al. .................. 264/141

FOREIGN PATENT DOCUMENTS

| DE | 2614730 | 4/1985 |
| DE | 3842072 | 12/1989 |
| DE | 197 06 374 A1 | 8/1998 |

* cited by examiner

Primary Examiner—Jan H. Silbaugh
Assistant Examiner—Donald Heckenberg
(74) Attorney, Agent, or Firm—Friedrich Kueffner

(57) ABSTRACT

An apparatus for the agglomeration of feed material with thermoplastic properties has a radially symmetrical hollow chamber with a perforated die defining its periphery and a front wall element and a rear wall element closing off ends of the hollow chamber. A material feeding system is connected to the hollow chamber. An agglomerating vane arranged in the hollow chamber rotates in a direction of rotation about a longitudinal axis of the hollow chamber. The agglomerating vane has a front side in the direction of rotation. The front side, the front and rear wall elements, and the perforated die define a revolving plasticizing chamber. The front and rear wall elements have inner surfaces facing the hollow chamber and at least one of the inner surfaces has profiles running from an inner area of the inner surface to an outer area of the inner surface for transporting the feed material.

32 Claims, 4 Drawing Sheets

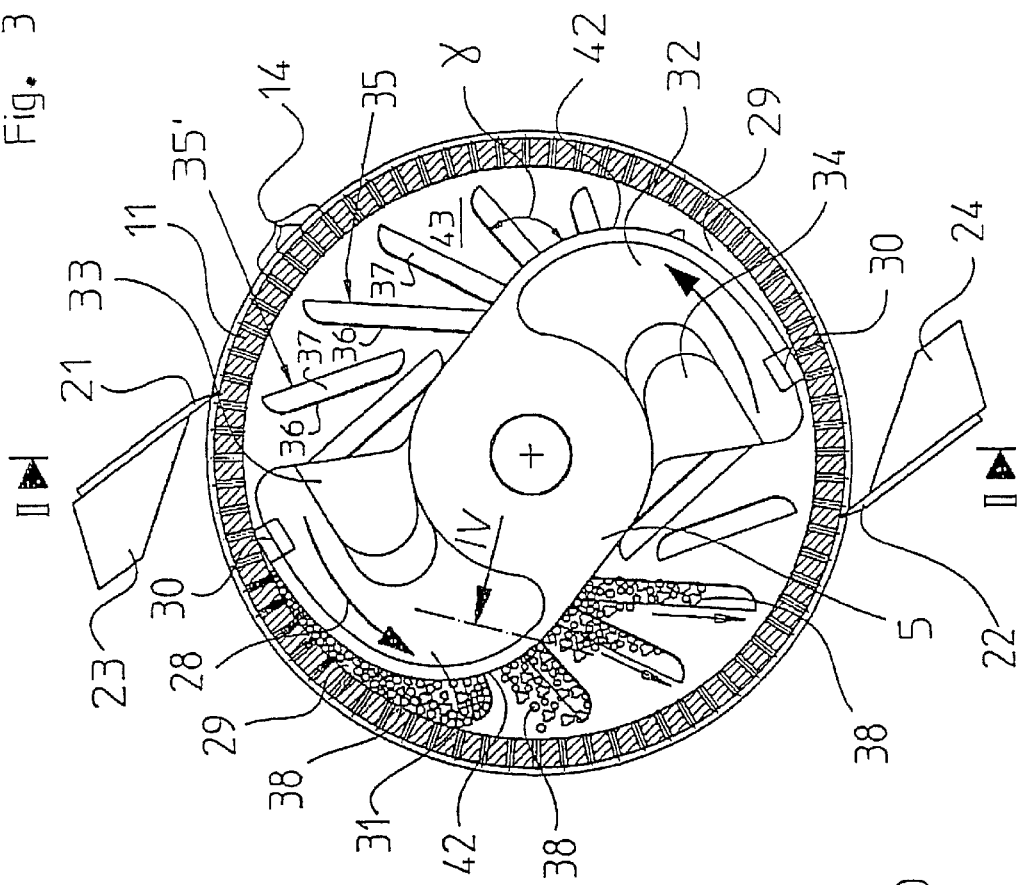
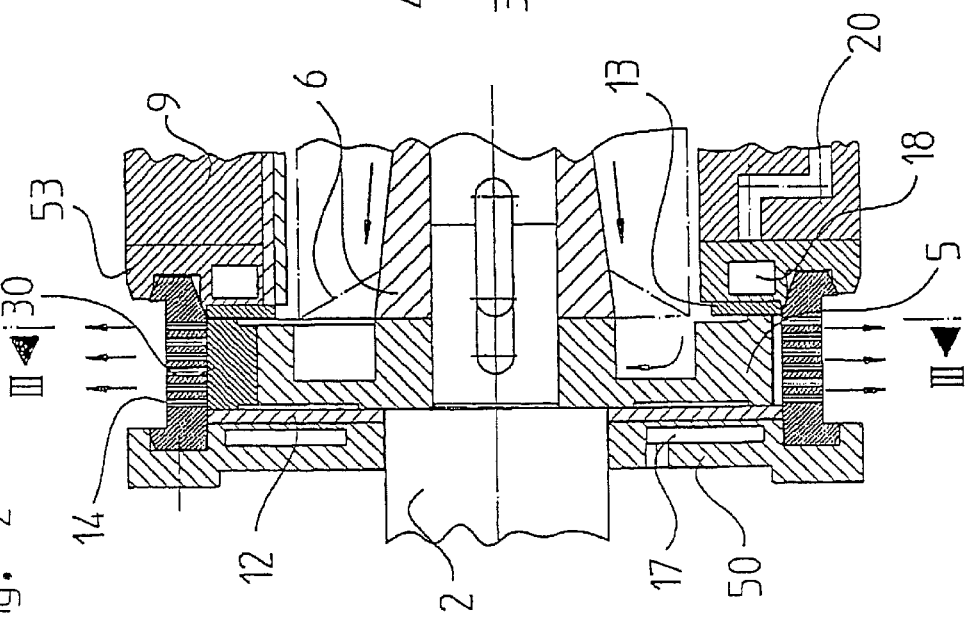

APPARATUS FOR THE AGGLOMERATION OF FEED MATERIAL WITH THERMOPLASTIC PROPERTIES

BACKGROUND OF THE INVENTION

1. Field of the Invention

The invention relates to an apparatus for the agglomeration of feed material with thermoplastic properties, comprising a radially symmetrical chamber delimited peripherally by a perforated die and at its end faces by a front wall element and a rear wall element, and comprising an agglomerating vane supported in the hollow chamber so as to be rotatable about the longitudinal axis of the hollow chamber and forming with its leading side in the rotational direction together with the two wall elements and the perforated die at least one revolving agglomeration chamber.

The invention further relates to a disc-shaped or ring-shaped wear element suitable for use with an apparatus of the aforementioned kind for delimiting a hollow chamber of radial symmetry.

2. Description of the Related Art

In the course of reutilization of waste material, the recycling of thermoplastic materials, e.g., films, fibers, filaments etc. made of plastic materials, gains more and more importance. In this connection, the thermoplastic waste material is transformed into an intermediate product in the form of granules which are then returned into the production process as starting material for use in extruders, injection molding machines and similar equipment.

During the expert treatment of thermoplastic waste material in an apparatus of the aforementioned kind, the feed material is always subjected to high agglomeration and shearing forces causing a great heat development within the agglomerator. This effect is desired within a temperature range below the type-specific melting point of the feed material since only by means of this heat development agglomeration is made possible. If during agglomeration the material-specific melting point is exceeded, there will be an irreversible alteration of the mechanical properties of the feed material which makes the valuable starting material unusable for further processing.

An apparatus for the agglomeration of thermoplastic wastes of the aforementioned kind is described in German Patent Specifications 26 14 730 C2 and 197 06 371 A1. These references disclose a disc-shaped annular chamber which is enclosed by a perforated die and into which the feed material is fed in the axial direction. A coaxially arranged agglomerating vane rotates in this chamber and forms with its effective flanks two revolving agglomeration chambers. The heat generated during compaction or agglomeration leads to a plasticizing of the feed material which, in turn, effects the passage of the feed material through the perforations of the die. To avoid thermal damage of the feed material, the agglomerator is equipped with a cooling system for dissipating the excess heat developed during the agglomeration and, in this way, the working temperature of the agglomerator is maintained within a range which is not critical to the feed material.

From the German Patent Specification 38 42 072 C1 an agglomerator is already known which differs from the already mentioned agglomerators insofar as the radially symmetrical chamber narrows radially towards the perforated die. This effects a three-dimensional processing of the feed material thus intensifying the compacting and plasticizing of the feed material and increasing in this way the specific throughput efficiency.

SUMMARY OF THE INVENTION

It is an object of the present invention to improve the known agglomerators so that the efficiency of the apparatus is increased without affecting negatively the heat generated in the agglomerator.

In accordance with the present invention, this is achieved in connection with the apparatus in that the surfaces of the front and/or rear wall elements facing the radially symmetrical chamber have profiles running from the inside to the outside for the transport of the feed material.

In accordance with the present invention, this is further achieved in connection with the wear element in that the wear element is configured to confine a radially symmetrical chamber wherein the wear element has profiles running from the inside to the outside.

The arrangement of the profiles on the inner surface of the wall elements according to the invention leads to a mostly defined flow of the feed material within the radially symmetrical chamber. In this connection, the feed material is moved on the shortest possible path along the profiles to the peripheral area of the hollow chamber where the actual plasticization and agglomeration takes place. In this way it is prevented that parts of the feed material reside too long in the central area of the hollow chamber where, even though they are entrained by the agglomerating vane, reach the plasticization area of the compacting chamber too slowly and are thus exposed to the high temperatures longer than necessary.

The configuration of the circular disc-shaped hollow chamber according to the invention achieves a forced material flow resulting in a shorter residence time of the feed material in the radially symmetrical hollow chamber. This provides, on the one hand, the advantage that, due to the shortened exposure time, the thermal stress is reduced and, accordingly, the danger of thermal damage to the feed material is minimized. On the other hand, the shortened residence time of the feed material in the agglomerator leads to a higher material throughput and thus to an increase of the efficiency of the agglomerator over all.

According to the invention, the profiles are preferably grooves worked into the inner surface of the wall elements. In this connection, the efficiency and thus the suitability of the grooves for the material transport depend mostly on their configuration details to be explained in the following.

The configuration of the grooves according to the invention provides the advantage of interacting with the rotating agglomerating vane which effects the advance of the feed material within the grooves during its rotation. Accordingly, the grooves according to a preferred embodiment have a longitudinal, plane guiding surface which acts counter to the rotating direction of the agglomerating vane such that the feed material being rotated by the agglomerating vane reaches the grooves and comes into contact with the guiding surface thereat. This prevents the feed material from continuously rotating and forces the feed material to change its direction of movement so that movement is parallel to the orientation of the grooves. The advance of the feed material is effected by the outer edges of the agglomerating vane; the outer edges define an intersecting point with the grooves, which point moves outwardly during rotation.

Compared to other configurations, the groove with a plane guiding surface has the advantage that its efficiency is not much impaired even after the first signs of wear are detected.

In contrast to this, in the case of grooves having, for example, a concave cross-section, wear very quickly leads to small intersection angles α of the groove with the inner surface of the wall elements, and the efficiency of the guiding surface is thus lost in this way.

Good results are obtained with grooves having a guiding surface which forms with the inner surface of the wall elements an angle α of 60 to 90°, wherein the optimum angle α always depends on the type of feed material and the specific configuration of the agglomerator.

In a further embodiment of the invention, the guiding surface forms with only one further plane surface the groove according to the invention, so that the groove has a triangular cross-section. The surfaces constituting the groove form preferably an angle β of 70 to 110°. The preferred angle β of 90° provides, in addition to a good material flow, further advantages with regard to a simple manufacture of such a groove.

Another embodiment of the invention is moreover preferred, in which the outer border of the groove is formed by a concave surface which is a continuous extension of the guiding surface. This measure offers the advantage that the outwardly directed material flow, when leaving the groove, undergoes a directional change counter to the rotational direction of the agglomeration vane and thus enhances the compaction and plasticization process considerably.

Apart from the special configuration of the grooves, their arrangement on the inner surface of the wall elements enclosing the radially symmetrical hollow chamber is of utmost importance for a rapid material flow within the agglomerator. An arrangement of the grooves on the inner surface of the wall elements, wherein the grooves form an angle γ of approximately 90° with the front side of the agglomerating vane, in the direction of rotation of the agglomerating vane, has proven to be especially suitable because in this configuration the feed material is advanced by the conveying edges of the agglomerating vane parallel to the direction of extension of the grooves. Due to the specific curvature of the front side of the agglomerating vane, an angle γ of 90° cannot generally be realized over the whole length of the groove. A good transport of the feed material by the agglomerating vane is achieved with an angle γ of 70° to 110°.

The invention comprises also a disc-shaped or ring-shaped wear element whose end faces facing the hollow chamber show the above described profiles and which thus can claim all the mentioned advantages. Moreover, the use of a wear element according to the present invention within an agglomerator offers the advantage that, when wear is at an advanced state, the quantity of parts to be replaced is limited to a minimum. It is furthermore possible to have the wear parts made of an especially wear-resistant material in order to increase the service life of the wear parts without increasing the production cost of the agglomerator significantly.

According to a further embodiment of the invention, the side walls (cooling disc and cooling ring), onto which the wear parts are fastened, are provided with channels suitable for receiving a coolant, so that excessive heat generation can be counteracted as closely as possible to the location of origin of the heat.

BRIEF DESCRIPTION OF THE DRAWING

In the drawing:

FIG. 2 is a section view of the central area of the apparatus shown in FIG. 1, taken along the line II—II of FIG. 1;

FIG. 3 is a section view of an apparatus according to the invention, taken along the line III—III of FIG. 2;

DESCRIPTION OF THE PREFERRED EMBODIMENTS

Figure 1:
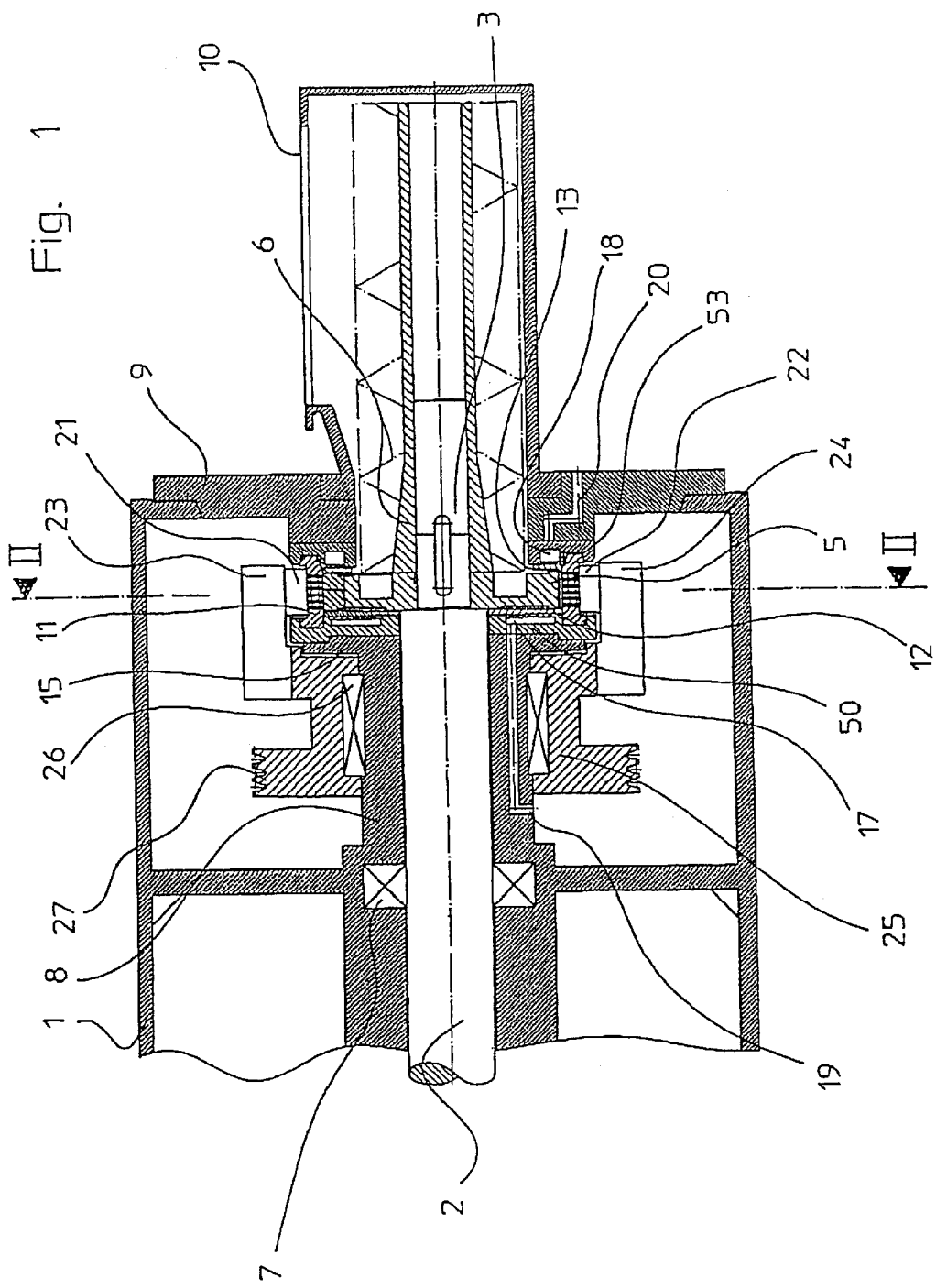
FIG. 1 is a longitudinal section view of an apparatus according to the invention.
Figure 4:
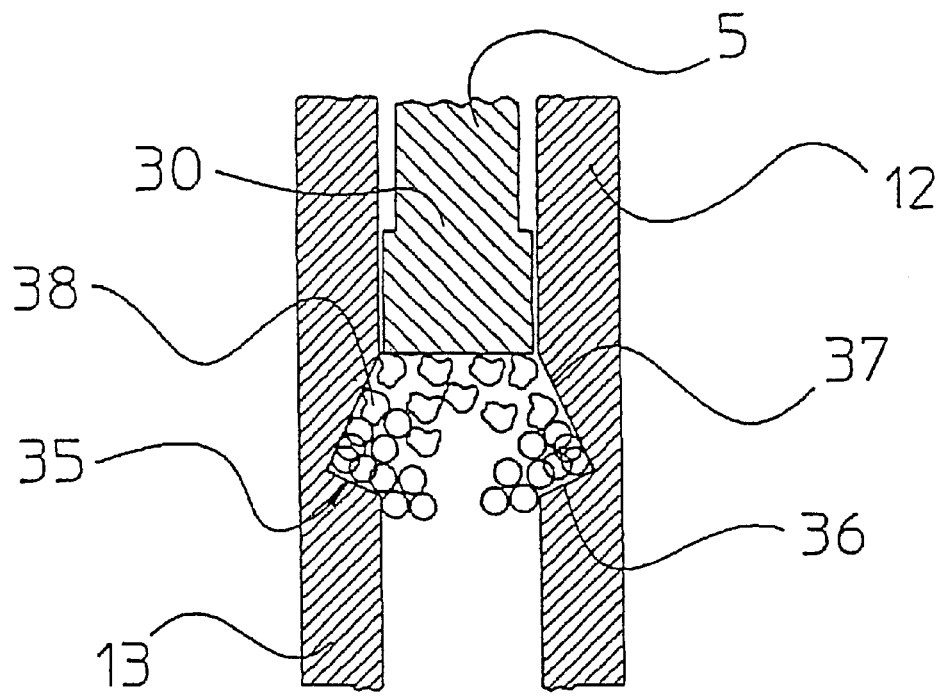
FIG. 4 shows another section view in the area of a groove according to the invention, taken along the line IV—IV of FIG. 3.
Figure 5:
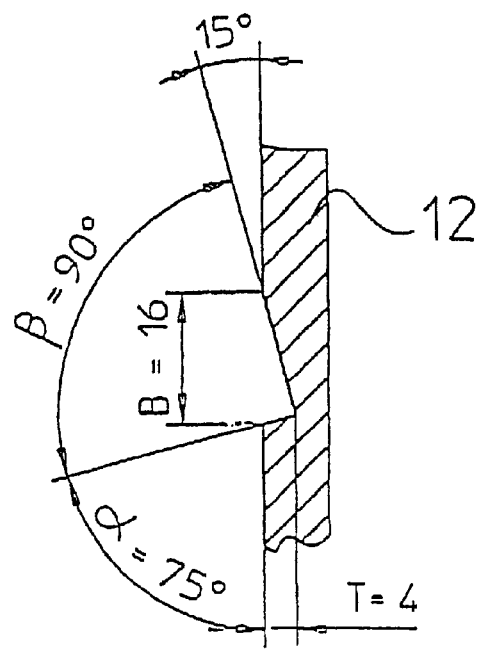
FIG. 5 is a section view of the constructive embodiment of a groove according to the invention.

FIG. 1 shows an axial longitudinal section view of an agglomerator according to the invention. The machine housing 1 is traversed in the horizontal direction by a driven shaft 2. The end of the shaft 2 resting in the interior of the agglomerator is formed as a shaft journal 3 serving as a seat for an agglomerating vane 5 designed as a symmetrical double blade vane and serving also as seat for a conveyor screw 6. The shaft 2 of the agglomerating vane 5 and the conveyor screw 6 form a unit cantilevered in the bearings 7 arranged in the tubular passageway 8 in the rear of the housing.

The face of the machine housing 1 has a coaxial circular opening closed by a door 9 that can be opened coaxially to the shaft 2. The housing door 9 forms simultaneously the front passageway of the housing for the conveyor screw 6 and serves for fastening the conveyor screw housing 10.

The agglomerating vane 5 is arranged in a circular disc-shaped hollow chamber 43 positioned concentrically to the drive shaft 2. On its periphery the chamber is enclosed by a perforated die 11 and on its ends by a wear disc 12 and a wear ring 13. The axial depth of the accordingly configured hollow chamber 43 corresponds approximately to the thickness of the agglomerating vane 5. Radial openings 14 are evenly distributed on the periphery of the perforated die 11. The wear disc 12 and a cooling disc 50 are screwed together and fastened to the housing flange 15 formed at the tubular passageway 8 of the housing whereas the wear ring 13 is connected to the housing cover 9 via a cooling ring 53. Cooling disc 50 as well as cooling ring 53 have ring channels 17 and 18, intended to receive the coolant which is supplied via the line 19 provided in the tubular passageway 8 of the housing and via a line 20 penetrating the housing cover 9.

On the outside of the perforated die 11, two revolving stripper knives 21 and 22 are positioned diametrically opposite to each other and are adjustably fastened in a holder 23 and 24, respectively. Both knife holders 23 and 24 are seated on a hub 25 which is rotatably supported on the rear housing passageway 8 by means of a bearing 26. The hub 25 carries a V-belt pulley 27 driven in rotation by a drive which is not shown in the drawing.

FIGS. 2 and 3 show clearly the agglomerating vane 5 as well as the perforated die 11 forming the radially symmetrical chamber 43, the wear disc 12 and the wear ring 13. An agglomerating vane 5 is shown, which has two diametrically opposed blades, rotating in the direction indicated by the arrow 28. In the direction of rotation 28, the front side of the two blades of the agglomerating vane 5, whose thickness corresponds to the thickness of the agglomerating vane, has a steadily curved contour 42. A sickle-shaped plasticizing chamber 29, steadily narrowing counter to the direction of rotation 28, is formed by the front side and the perforated die 11 and is closed relative to the perforated die 11 by the thrust piece 30 fastened at the end of the blade. Both blades of the agglomerating vane 5 have zones 31 and 32 of reduced thickness which allow a substantially free rotation of the agglomerating vane 5 in the circular disc-shaped hollow chamber 43. To form the pockets 33 and 34, the thickness of the agglomerating vane 5 in the feeding zone defined by the conveyor screw 6 is further reduced, thus achieving a more uniform distribution of the feed material 38 within the hollow chamber 43.

The profiles according to the invention in the form of grooves 35 and 35' and their arrangement are shown in detail in FIGS. 3 to 7. The grooves 35, 35' have an elongate shape whose ends have the shape of a quarter circle. In this special embodiment, the grooves 35, 35' are formed by a first plane surface 36 which takes over the function of a guiding surface and a second plane limiting surface 37, wherein the intersection lines of the surfaces 36 and 37 define an angle β of 90° between them. The limiting surface 37 may also have a concave cross-section. The guiding surface 36 defines with the adjacent surface of the wear disc 12 and the wear ring 13, respectively, an angle α of 75°, so that an intersection angle of 15° results between the limiting surface 37 and the surface of the wear disc 12 and the wear ring 13, respectively.

In this particular embodiment, the limiting surface 37 provides in good time and gradually enough space for the feed material penetrating into the grooves 35, 35', wherein the feed material then impinges frontally on the guiding surface 36 where the flow of material, with the aid of the agglomerating vane 5, is deflected towards the perforated die 11.

A good material flow can be obtained with grooves 35, 35' having a width B of 16 mm and a depth T of 4 mm because this provides a sufficiently large volume for receiving the feed material 38.

Figure 6:
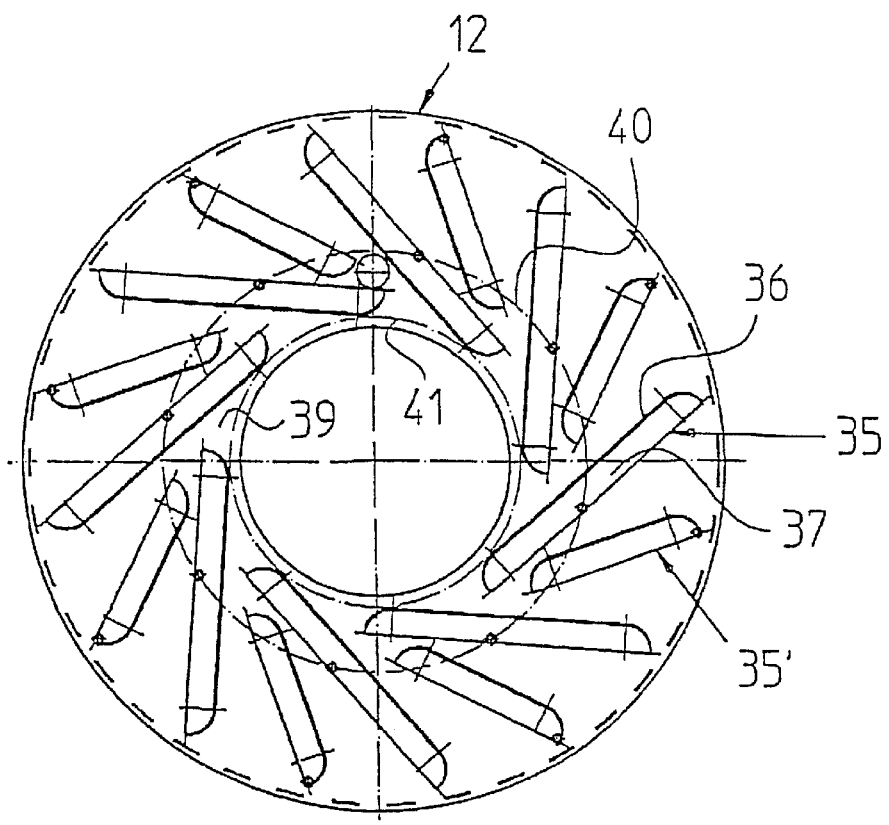
FIG. 6 is a top view of a disc-shaped wear element.
Figure 7:
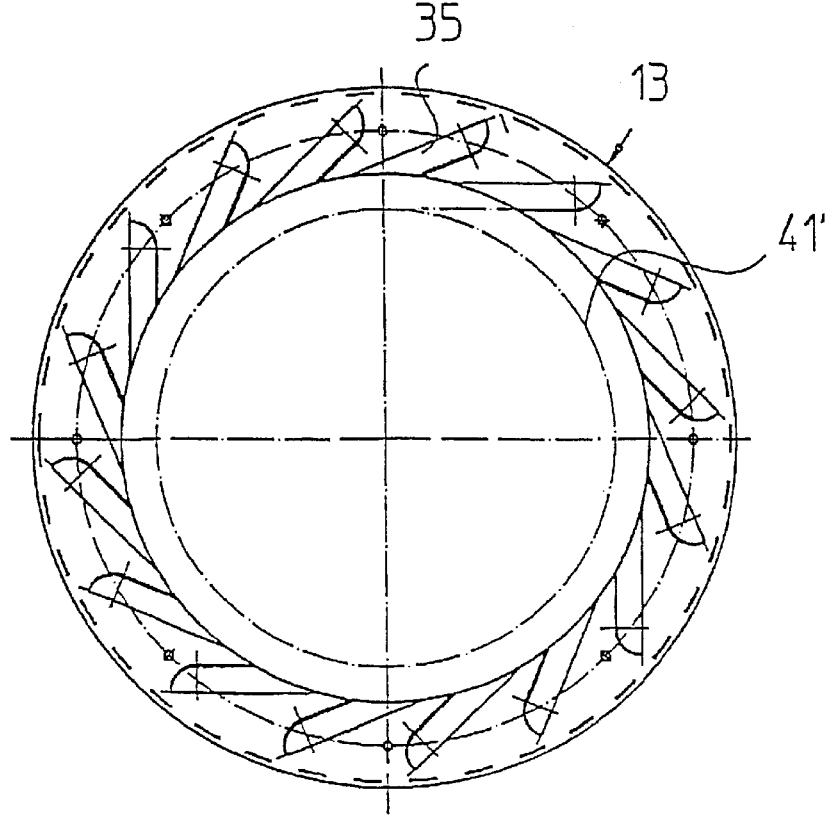
FIG. 7 is a top view of a ring-shaped wear element.

The arrangement of the grooves 35 and 35' on the inwardly facing end face of the wear disc 12 and the wear ring 13 is illustrated, in particular, in FIGS. 6 and 7. The grooves 35 and 35' are uniformly distributed over the periphery of the wear elements 12, 13 and extend in the direction of rotation 28 tangentially to a reference circle 41 and 41', respectively. The guiding surface 36 forms a kind of leading ramp toward the perforated die 11 for the incoming material flow.

The grooves 35 extend from an inner area or central zone 39, located within the dashed line 40 and opposite to the outlet section of the conveyor screw 6, to the outer area or peripheral zone of the wear disc 12. In this connection, a radial minimum distance to the perforated die 11 of 1/20 to 1/60 of the outer diameter of the wear disc 12 and the wear ring 13, respectively, is observed depending on the machine size in order not to impair the compacting and plasticizing effect which is greatest in the outer periphery of the hollow chamber. Two grooves 35 adjacently positioned in the peripheral direction define an angle of 45° between them.

Between two grooves 35 there is another groove 35', respectively, which is shorter in the longitudinal direction and consequently does not reach as far into the central zone 39. The grooves 35' are located on a bisecting line of an angle between two grooves 35. Since in the central zone 39 there is naturally less surface area available for receiving the grooves 35 and 35' than in the outer area of the wear disc 12, this alternating arrangement of longer and shorter grooves 35 and 35' avoids criss-crossing of the grooves 35 and 35' with one another which would impair a defined material flow at least in the zone where the grooves 35 and 35' would cross.

When operating an apparatus according to the invention, the feed material 38 is first conveyed through the conveyor screw housing 10 to the conveyor screw 6 which transports it into the circular disc-shaped hollow chamber 43 where the agglomerating vane 5 rotates in the direction shown by the arrows 28 and forms with its two blades two revolving agglomeration chambers 29. In the chambers 29 the feed material 38 is first precompacted by the continuous feeding of material via the conveyor screw 6.

The front side 42 of the agglomerating vane 5 in direction of rotation 28 pushes the precompacted feed material 38 ahead in a circular or helical movement within the hollow chamber 43. As a consequence of the expansion pressure of the feed material 38 it reaches the grooves 35, 35' where the circular and helical movement of the feed material 38 is stopped by the guiding surface 36 (FIG. 4) and is deflected in a linear movement direction along the grooves 35, 35' toward the perforated die 11 (FIG. 3). The advancing force acting on the feed material 38 is realized by the front edges, in direction of rotation of the agglomerating vane 5, facing the wear elements 12, 13. Due to the continuous curvature of the front edges, the front edges form with the grooves 35, 35' an intersecting point moving outwardly to the peripheral zone of the hollow chamber 43 during rotation. At the outer end of the grooves 35, 35' the guiding surface 36 becomes a concavely curved surface so that the feed material 38, when exiting the grooves 35, 35', experiences a directional change counter to the movement direction 28 of the agglomerating vane 5.

The main compacting and agglomeration work, however, is done in the peripheral zones of the hollow chamber where, as a consequence of the tapering compacting chamber 29, the feed material 38 is steadily reduced to a smaller volume until it begins to plasticize as a result of the increasing pressure conditions and the resulting frictional heat and exits from the compacting chambers 29 in the form of plastic filaments via the radial openings 14 of the perforated die 11 to then be cut to granules by the revolving stripper knives 21.

While specific embodiments of the invention have been shown and described in detail to illustrate the inventive principles, it will be understood that the invention may be embodied otherwise without departing from such principles.

What is claimed is:

1. An apparatus for the agglomeration of feed material with thermoplastic properties, the apparatus comprising:
 a radially symmetrical hollow chamber comprising a perforated die defining a periphery of the hollow chamber and a front wall element and a rear wall element closing off ends of the hollow chamber;
 a material feeding system connected to the hollow chamber;
 an agglomerating vane arranged in the hollow chamber and configured to rotate in a direction of rotation about a longitudinal axis of the hollow chamber;
 the agglomerating vane having a front side in the direction of rotation, wherein the front side, the front and rear wall elements, and the perforated die define at least one revolving plasticizing chamber in the hollow chamber;
 wherein the front wall element has an inner surface facing the hollow chamber and the rear wall element has an inner surface facing the hollow chamber, wherein at least one of the inner surfaces of the front and rear wall elements has profiles running from an inner area of the inner surface to an outer area of the inner surface, wherein the profiles are configured to transport the feed material.

2. The apparatus according to claim 1, wherein the profiles are grooves.

3. The apparatus according to claim 2, wherein the grooves have, in a longitudinal direction thereof, at least one guiding surface with a plane cross-section, wherein the at least one guiding surface acts counter to a circular direction of movement of the feed material in the hollow chamber.

4. The apparatus according to claim 3, wherein the guiding surface and an adjoining surface area of the inner surface of the front and rear wall elements define an angle $\alpha$ of 60 to 90° with one another.

5. The apparatus according to claim 4, wherein the angle $\alpha$ is 75°.

6. The apparatus according to claim 2, wherein the grooves have a depth T of at least 2.5 mm.

7. The apparatus according to claim 6, wherein the grooves have a depth T of 4.00 mm.

8. The apparatus according to claim 2, wherein the grooves have a width B of 10 to 30 mm.

9. The apparatus according to claim 8, wherein the grooves have a width B of 16 mm.

10. The apparatus according to claim 2, wherein the grooves are formed in a longitudinal direction thereof by two plane surfaces positioned at an angle $\beta$ of 70 to 110°.

11. The apparatus according to claim 10, wherein the two plane surfaces are positioned at an angle $\beta$ of 90°.

12. The apparatus according to claim 3, wherein the grooves have outer ends ending in a concavely curved surface which adjoins continuously the guiding surface.

13. The apparatus according to claim 1, wherein the profiles have outer ends positioned at a distance to the perforated die, wherein the distance is at least 1/60 of a diameter of the hollow chamber.

14. The apparatus according to claim 13, wherein the distance is 1/40 of the diameter of the hollow chamber.

15. The apparatus according to claim 1, wherein the profiles are oriented such on the inner surfaces of the front and rear wall elements that the profiles and a tangent at a point of intersection of the profiles with the front side of the agglomerating vane define an angle $\gamma$ of 70 to 110°.

16. The apparatus according to claim 15, wherein the angle $\gamma$ is 90°.

17. The apparatus according to claim 1, wherein the profiles extend tangentially to a reference circle positioned coaxially to the longitudinal axis of the hollow chamber, wherein the profiles extend from the tangent point on the reference circle in the direction of rotation.

18. A disc-shaped or ring-shaped wear element for the apparatus according to claim 1, configured to confine the hollow chamber, wherein the wear element has an end face facing the hollow chamber and having profiles running from an inner area to an outer area of the end face.

19. The wear element according to claim 18, wherein the profiles are grooves.

20. The wear element according to claim 19, wherein the grooves have in a longitudinal direction thereof at least one guiding surface with a plane cross-section, wherein the at least one guiding surface acts counter to a circular direction of movement of the feed material in the hollow chamber.

21. The wear element according to claim 20, wherein the guiding surface and an adjoining surface area of the end face of the wear element define an angle $\alpha$ of 60 to 90° with one another.

22. The wear element according to claim 21, wherein the angle $\alpha$ is 75°.

23. The wear element according to claim 19, wherein the grooves have a depth T of at least 2.5 mm.

24. The wear element according to claim 23, wherein the grooves have a depth T of 4.00 mm.

25. The wear element according to claim 19, wherein the grooves have a width B of 10 to 30 mm.

26. The wear element according to claim 25, wherein the grooves have a width B of 16 mm.

27. The wear element according to claim 19, wherein the grooves are formed, in a longitudinal direction thereof, by two plane surfaces positioned at an angle $\beta$ of 70 to 110°.

28. The wear element according to claim 27, wherein the two plane surfaces are positioned at an angle $\beta$ of 90°.

29. The wear element according to claim 20, wherein the grooves have outer ends ending in a concavely curved surface which adjoins continuously the guiding surface.

30. The wear element according to claim 18, having a periphery, wherein the profiles have outer ends positioned at a distance to the periphery of the wear element, wherein the distance is at least 1/60 of a diameter of the hollow chamber.

31. The wear element according to claim 30, wherein the distance is 1/40 of the diameter of the hollow chamber.

32. The wear element according to claim 18, wherein the profiles run tangentially to a reference circle coaxial to the wear element and are oriented from the tangent point in a direction of rotation of the agglomerating vane of the apparatus.

* * * * *